H. VAN ALTENA.
Culinary Vessels.

No. 147,580.  Patented Feb. 17, 1874.

Witnesses:

Inventor:
Henry Van Altena

UNITED STATES PATENT OFFICE.

HENRY VAN ALTENA, OF MILWAUKEE, WISCONSIN.

IMPROVEMENT IN CULINARY VESSELS.

Specification forming part of Letters Patent No. 147,580, dated February 17, 1874; application filed January 23, 1874.

*To all whom it may concern:*

Be it known that I, HENRY VAN ALTENA, of Milwaukee, in the county of Milwaukee, in the State of Wisconsin, have invented certain Improvements in Culinary Steamers, of which the following is a specification:

My invention has for its object the cooking of the various articles of food by boiling or steaming, and is accomplished by an outside boiler with a steamer standing in the inside of it, with a perforated bottom. This bottom is movable, so that it can be allowed to rest on the bottom of the steamer when it is used for boiling, and be raised up when it is used as a steamer.

Figure 1:
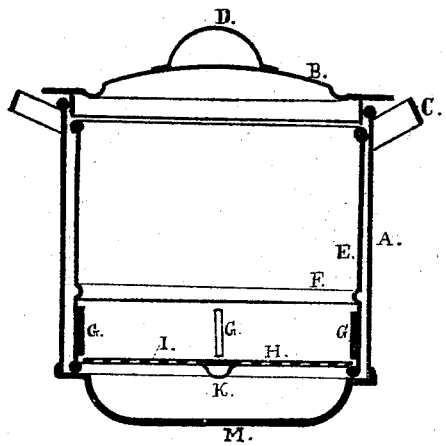
Figure 2:
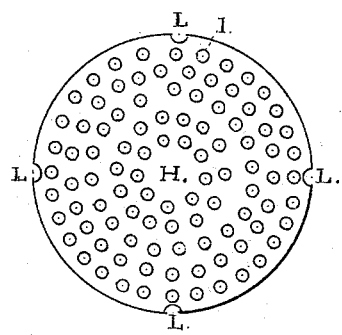

Figure 1 is a vertical sectional view of my invention, and Fig. 2 is a view of the bottom of the steamer.

A is the outside kettle; B, the cover; C, the ears with which to handle it; D, the handle of the cover; E, the steamer; F, a bead in the steamer to prevent the bottom from passing up farther than the top of the guides; H, the perforated bottom; I, the perforations; K, a handle on the bottom with which to handle it; L, notches in the bottom for the guides G to fit in when the bottom is raised or lowered; M, bottom of the outside kettle, with a ledge on which the steamer sits.

This steamer is operated as follows: Fill the outside kettle with water below the bottom H, if the steamer is to be used as a steamer, and the bottom H is raised to the top of guides G, and turned round so that the notches L shall come between the guides G, and the bottom will then rest on the guides; then place the kettle A, with the steamer E in it, over the fire, in a stove, and put whatever you wish to cook in the steamer, and the water will boil and steam and cook the articles therein.

If the steamer and kettle are to be used for boiling, then drop the bottom down to the bottom of the steamer, and fill in with water high enough to cover what you wish to boil. This steamer is very handy to boil eggs in, for when they are cooked lift the steamer out of the kettle, and your eggs will come out dry.

I claim as my invention—

The combination of kettle A, steamer E, guides G, and bottom H, substantially as described.

HENRY VAN ALTENA.

Witnesses:
   J. B. SMITH,
   A. SCHALTENBERG.